No. 865,302. PATENTED SEPT. 3, 1907.
B. M. W. HANSON.
CLUTCH MECHANISM.
APPLICATION FILED AUG. 9, 1905.
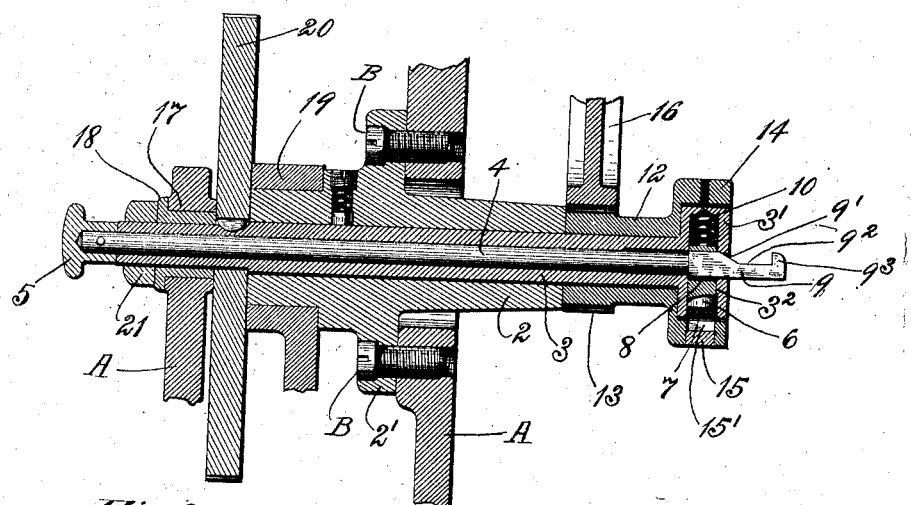
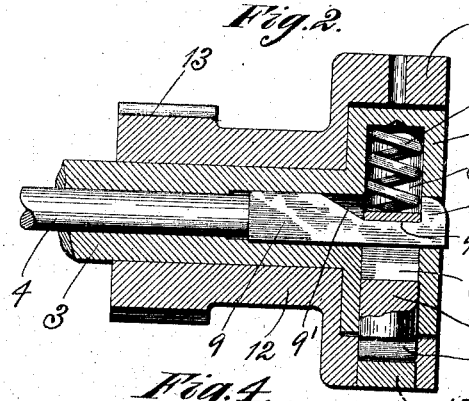
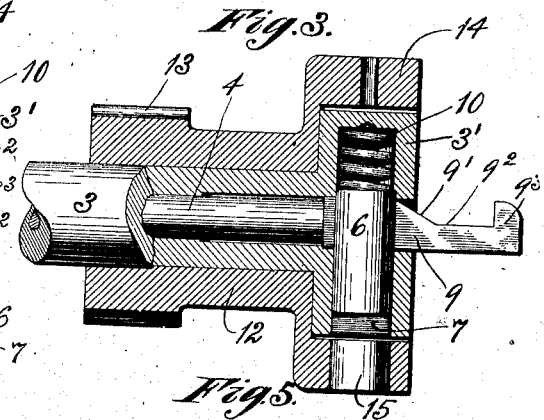
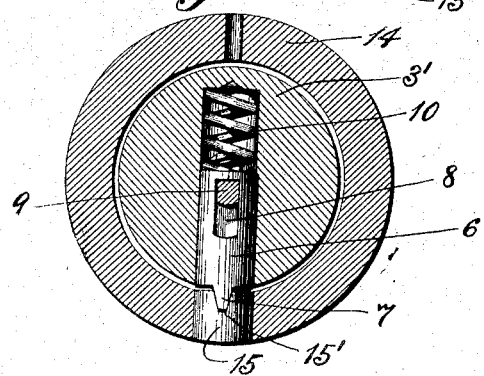
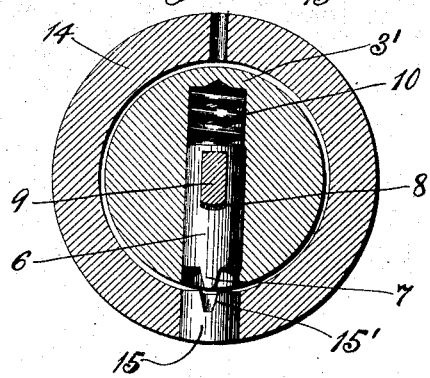
Witnesses:
S. S. Grotta
F. E. Anderson
Inventor:
B. M. W. Hanson,
By his Attorney,

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

CLUTCH MECHANISM.

No. 865,302.

Specification of Letters Patent.

Patented Sept. 3, 1907.

Application filed August 9, 1905. Serial No. 273,477.

*To all whom it may concern.*

Be it known that I, BENGT M. W. HANSON, a citizen of Sweden, having declared my intention of becoming a citizen of the United States, residing at Hartford, in the county of Hartford and State of Connecticut, have invented certain new and useful Improvements in Clutch Mechanism, of which the following is a specification.

This invention relates to improved means for fulfilling the requirements or conditions that occur in machine-construction for engaging or disengaging the power-transmitting devices from one shaft to another shaft, and the object thereof is the provision of improvements whereby the result desired may be accomplished in a quick and reliable manner.

In the accompanying drawings, Figure 1 is a vertical sectional view of the invention. Fig. 2 is an enlarged vertical sectional view embodying the improvements, showing the position of the parts when the clutch is in engagement. Fig. 3 is a vertical sectional view of the same parts shown in Fig. 2, showing the clutch-elements disengaged. Figs. 4 and 5 are transverse sectional views of Fig. 3, illustrating, respectively, the clutch in engagement and disengagement.

Referring to the drawings, a portion of a frame A of a machine is shown, in Fig. 1, and attached to a part of this frame by means of screws B is a sleeve-bearing 2, which has an external flange 2' through which said screws pass. In this sleeve-bearing the driving-shaft 3 is mounted and this shaft is made hollow, and through it a rod 4 passes. On one end of this rod is a knob 5, which may be grasped to withdraw or push in the rod to engage or disengage the clutch-element hereinafter described.

At its inner end the driving-shaft 3 is fitted with a head 3', which is transversely bored at $3^2$ to receive a plunger clutch-pin 6, said pin having at its outer end a beveled tooth 7, and being also provided with a slot or aperture 8 for the reception of a device hereinafter described.

At the end opposite the knob 5, the rod 4 is provided with a flattened head 9 having an incline 9', a straight part $9^2$, and a hook or projection $9^3$, as illustrated in Figs. 1, 2 and 3.

In the chamber $3^2$ of the head 3', and above the clutch-pin or plunger 6, is fitted a helical spring 10, the tendency of which is to force said plunger downward. In the slot 8 of the plunger the head 9 is fitted, and when said rod is pushed inward, as illustrated in Figs. 1 and 3, the inclined part 9' of the head 9 will force the plunger 6 rearward against the stress of spring 10, and will withdraw the clutching-point or projection 7 from the device with which it is engaged, but when the knob 5 is grasped and the rod is pulled outward, said spring will force the plunger outward and cause the upper wall of the aperture 8 therein to be seated in the depression formed by the straight part $9^2$, and the tooth 7 will then be in engagement with the part to be driven, as shown in Figs. 2 and 4,—the projection or hook $9^3$ serving as a stop to prevent the head 9 from being pulled out of said aperture.

Loosely mounted on the driving-shaft 3 and head 3' is a sleeve 12, having at its inner end a pinion 13, and at its outer extremity a head 14 surrounding the head 3' of said driving-shaft. A plug 15 having a socket 15' conforming to the tooth 7 of plunger 6 is secured in a bore of the head 14, and the sleeve 12 is prevented from longitudinal movement on shaft 3 by the end of the sleeve-bearing 2 and by the head 3'.

Designated by 16 is a gear with which the pinion 13 engages, and said gear may communicate motion to a shaft or other element (not shown) which it may be desired to drive.

In a bearing 17 of another part of the frame A a flanged bushing 18 is mounted, and the driving-shaft 3 is journaled partly in said bushing and partly in the sleeve-bearing 2, the other, reduced end of said sleeve-bearing being inserted in a bearing 19 in another part of said frame. While any means may be employed for driving the shaft 3, I have shown a gear 20 keyed to said shaft between the bearings 17 and 19. A collar 21 on the outer end of the shaft 3 prevents longitudinal inward movement of the same.

In the operation of the invention the shaft 3 is either continuously or intermittingly rotated by any desired means, for instance, the gear 20, and in the position of the parts illustrated in Figs. 1 and 2 rotates idly in the sleeve-bearing 2, but when it is desired to drive the sleeve 12 and its pinion 13, the knob 5 is grasped, the rod 4 and its head 9 are pulled inward, and the spring 10 throws the clutch-plunger 6 to the position shown in Figs. 2 and 4, thus establishing a connection between the driving-shaft and the sleeve 12, and actuating the parts to be driven by said sleeve. Plug 15 serves as a hardened wearing-surface, and prevents lost-motion or chattering due to wear at the points where the clutch-engagement is made.

Changes may be made in various details of the invention, which is not limited to the precise devices shown and described.

Having thus described my invention what I claim is:

1. The combination, with framework, of a sleeve-bearing projecting therefrom; a tubular driving-shaft mounted in said sleeve-bearing, and having a chambered head; a clutch-plunger having a transverse slot mounted in the chamber of the head; a spring for throwing said clutch-plunger in one direction; a rod movable in the bore of the driving-shaft, and having its end shaped to enter said transverse slot, and actuate the clutch-plunger against the stress of the spring; a power-transmitting sleeve surrounding the driving-shaft and its chambered head; and a complemental clutch-element carried by said sleeve.

2. The combination, with a sleeve-bearing, and with means for supporting the same, of a tubular driving-shaft having a chambered head; a transversely-slotted clutch-plunger mounted in the chamber of said head; a spring for throwing said clutch-plunger in one direction; a rod movable in the tubular driving-shaft, and having an inclined portion entering the slot of the clutch-plunger, and serving to actuate said plunger against the stress of the spring; and a sleeve surrounding said driving-shaft and its chambered head.

3. The combination, with a sleeve-bearing, of a tubular driving-shaft mounted therein, said shaft having a chambered head; a clutch-plunger mounted in the chamber of said head; a spring backing said clutch-plunger; a rod mounted in the bore of the driving-shaft; means carried by said rod for actuating the clutch-plunger against the stress of the spring; a sleeve surrounding the driving-shaft, and having a head enveloping the head of said driving-shaft; a clutch-element carried by the sleeve; and a power-transmitting element also carried by the sleeve.

4. The combination, with a sleeve-bearing, of a tubular driving-shaft mounted in said sleeve-bearing, said driving-shaft having a chambered head; a transversely-slotted clutch-plunger mounted in the chamber of said head; a helical spring backing said plunger; a rod movable in a bore of the driving-shaft, and having a head provided with inclined and straight portions, said head passing through the slot of the plunger; a power-transmitting sleeve loose on the driving-shaft, and also having a head surrounding the head of said driving-shaft; a clutch-element carried by the head of the sleeve; and means for actuating said tubular driving-shaft.

5. The combination, with a bearing-sleeve, of a tubular driving-shaft mounted in said bearing-sleeve, said driving shaft having a chambered head; a transversely-slotted clutch-plunger movable in the chamber of said head; a spring for normally throwing said clutch-plunger to its clutching-position; a rod mounted in the bore of the driving-shaft; a manipulating-device carried by said rod; a head on the slotted end of the rod, said head passing through the slot of the clutch-plunger, and having inclined and straight portions and a stop projection; a power-transmitting sleeve having a head conforming to the head of the driving-shaft, said sleeve being loosely-mounted on the driving-shaft; and a clutch-element carried by the sleeve, and coöperating with said clutch-plunger.

6. The combination, with a bearing-sleeve, of a tubular driving-shaft mounted in said sleeve and having a chambered head; a transversely-slotted clutch-plunger movable in the head; a spring for throwing said clutch-plunger to its clutching-position; a rod movable in the bore of the driving-shaft, and having a manipulating knob; a flattened head on said rod, said flattened head having inclined and straight portions and a stop, and being movable in the slot of the clutch-plunger; a clutch-lock carried by the clutch-plunger; a power-transmitting sleeve surrounding the driving-shaft, and having a head encircling the head of said driving-shaft; and a plug carried by the head of said power-transmiting sleeve, and having a notch to receive the tooth of the clutch-plunger.

In testimony whereof I affix my signature in presence of two witnesses.

BENGT M. W. HANSON.

Witnesses:
N. S. BATES,
J. W. JOHNSON.